US009766633B2

(12) United States Patent
Lederle et al.

(10) Patent No.: US 9,766,633 B2
(45) Date of Patent: Sep. 19, 2017

(54) METHOD AND DEVICES FOR EQUALIZING A GROUP OF CONSUMERS IN A FLUID TRANSPORT SYSTEM

(75) Inventors: Norbert Markus Lederle, Laufenburg (DE); Urs Keller, Hinwil (CH); Reto Hobi, St. Gallenkappel (CH); Peter Schmidlin, Uster (CH)

(73) Assignee: BELIMO HOLDING AG, Hinwil (CH)

( * ) Notice: Subject to any disclaimer, the term of this patent is extended or adjusted under 35 U.S.C. 154(b) by 696 days.

(21) Appl. No.: 14/129,139

(22) PCT Filed: Jun. 20, 2012

(86) PCT No.: PCT/EP2012/061819
§ 371 (c)(1),
(2), (4) Date: Jan. 30, 2014

(87) PCT Pub. No.: WO2013/000785
PCT Pub. Date: Jan. 3, 2013

(65) Prior Publication Data
US 2014/0150883 A1 Jun. 5, 2014

(30) Foreign Application Priority Data

Jun. 30, 2011 (CH) ..................... 1102/11

(51) Int. Cl.
G05D 7/00 (2006.01)
G05D 7/06 (2006.01)
F24D 19/10 (2006.01)

(52) U.S. Cl.
CPC ....... G05D 7/0617 (2013.01); F24D 19/1009 (2013.01); *Y10T 137/0368* (2015.04); *Y10T 137/7759* (2015.04)

(58) Field of Classification Search
CPC ............... Y02B 60/144; Y02B 90/245; Y02B 70/3225; Y02B 70/346; Y02B 60/33;
(Continued)

(56) References Cited

U.S. PATENT DOCUMENTS 7,819,983 B2 * 10/2010 Kim ..................... A47L 15/0052
134/25.2
8,606,413 B2 * 12/2013 Picton ..................... E03B 7/071
700/282

(Continued)

FOREIGN PATENT DOCUMENTS

CN 201555304 U 8/2010
CN 201844453 U 5/2011
(Continued)

OTHER PUBLICATIONS

Communication dated Dec. 10, 2015 from the State Intellectual Property Office of People's Republic of China in counterpart application No. 201280032528.6.
(Continued)

Primary Examiner — Darrin Dunn
(74) Attorney, Agent, or Firm — Sughrue Mion, PLLC

(57) ABSTRACT

For the purpose of balancing (S3) a group of consumers in a fluid transport system in which each consumer is configured with a motorized regulating valve for the purpose of regulating the flow through the consumer, characteristic data for the consumer is saved (S2) which determines a valve position of the corresponding regulating valve for the target throughput through each consumer. A momentary total throughput through the group of consumers is determined (S32) by means of a common throughput sensor, and based on the momentary total throughput and a sum of the desired target throughputs through the consumers, a balancing factor is determined (S34). By setting (S31) the valve positions of the corresponding regulating valves based on the character-
(Continued)

istic data and the balancing factor, a dynamic balancing of the consumers is carried out.

17 Claims, 3 Drawing Sheets

(58) Field of Classification Search
CPC ........ Y04S 20/40; Y04S 20/525; Y04S 10/54; Y04S 10/12; Y04S 20/228; G06Q 50/06; G06Q 10/06
See application file for complete search history.

(56) References Cited

U.S. PATENT DOCUMENTS

| | | | | |
|---|---|---|---|---|
| 2003/0225905 A1* | 12/2003 | Scifres | .................... | H04L 47/10 709/234 |
| 2005/0246102 A1* | 11/2005 | Patwardhan | ........... | A01G 25/16 702/2 |
| 2007/0100475 A1* | 5/2007 | Korchinski | .......... | G05B 13/042 700/28 |
| 2008/0119948 A1* | 5/2008 | O'Connor | .............. | A01G 25/16 700/9 |
| 2008/0178019 A1* | 7/2008 | McGrane | .................. | G06F 1/26 713/320 |
| 2009/0002157 A1* | 1/2009 | Donovan | .................. | H04N 7/18 340/540 |
| 2009/0101338 A1* | 4/2009 | Flanders | ............. | E21B 47/0007 166/250.01 |
| 2009/0113221 A1* | 4/2009 | Holle | ....................... | G06F 1/189 713/310 |
| 2010/0268562 A1* | 10/2010 | Anderson | ............ | A01G 25/167 705/7.25 |
| 2010/0289652 A1* | 11/2010 | Javey | ....................... | H04Q 9/00 340/605 |
| 2010/0312399 A1* | 12/2010 | Borgmann | .......... | B21B 45/0218 700/282 |
| 2011/0066297 A1* | 3/2011 | Saberi | .................... | F16K 31/046 700/287 |
| 2011/0209765 A1* | 9/2011 | Mozayeny | ............. | A01G 25/16 137/1 |
| 2011/0290329 A1* | 12/2011 | Garza | ........................ | E02B 3/00 137/2 |
| 2011/0290331 A1* | 12/2011 | Burrows | ................... | E03B 7/02 137/14 |
| 2011/0308740 A1* | 12/2011 | Priest | ................... | B01D 1/0082 159/16.1 |
| 2012/0101934 A1* | 4/2012 | Lindores | ................ | G06Q 10/06 705/37 |
| 2012/0116599 A1* | 5/2012 | Arndt | ........................ | G06F 1/26 700/291 |
| 2012/0116693 A1* | 5/2012 | Jaeger | .................... | G01D 4/002 702/45 |
| 2013/0048114 A1* | 2/2013 | Rothman | ............ | F24D 19/1012 137/551 |
| 2014/0039849 A1* | 2/2014 | Preis | ......................... | E03B 7/02 703/1 |
| 2014/0303798 A1* | 10/2014 | Saliba | .................... | G06Q 10/00 700/291 |
| 2016/0010878 A1* | 1/2016 | Lee | ....................... | G05B 13/048 700/300 |
| 2016/0054009 A1* | 2/2016 | Rothman | ............ | F24D 19/1012 700/282 |

FOREIGN PATENT DOCUMENTS

| | | |
|---|---|---|
| DE | 199 12 588 A1 | 9/2000 |
| EP | 0 795 724 A1 | 9/1997 |
| EP | 2 085 707 A2 | 8/2009 |
| EP | 2 157 376 A2 | 2/2010 |

OTHER PUBLICATIONS

International Search Report for PCT/EP2012/061819 dated Jul. 31, 2013.

\* cited by examiner

METHOD AND DEVICES FOR EQUALIZING A GROUP OF CONSUMERS IN A FLUID TRANSPORT SYSTEM

CROSS REFERENCE TO RELATED APPLICATIONS

This is a National Stage of International Application No. PCT/EP2012/061819 filed Jun. 20, 2012, claiming priority based on Swiss Patent Application No. 01102/11 filed Jun. 30, 2011, the contents of all of which are incorporated herein by reference in their entirety.

TECHNICAL FIELD

The present invention relates to a method and devices for balancing a group of consumers in a fluid transport system. The present invention particularly relates to a method and to devices for balancing a group of consumers in a fluid transport system in which each consumer is configured with a motorized regulating valve for the purpose of regulating the flow through the consumer.

PRIOR ART

Fluid transport systems typically comprise multiple consumers, meaning parallel branches or lines, through which a liquid or gaseous fluid is transported—for example to distribute thermal energy. The consumers typically have different designs, meaning that they have different diameters and/or lengths of the transport lines—for example, pipe conduits—and have different and/or varying flow volumes and/or throughput. In order to undertake a balanced and/or compensated distribution of the fluids to the consumers in such fluid transport systems, the consumers are each configured with a compensation- or balancing organ, for example an adjustable actuator, particularly a valve, which can set the flow through the respective consumer at different degrees of opening and/or valve positions.

A balancing method for a network for the distribution of a non-compressed liquid is described in DE 69706458, wherein for each branch, two pressure connection points are arranged on both sides of the compensating organ, and a further third pressure connection point is arranged at a distance therefrom. In all branches, flow measurements are carried out by measuring the difference in flow on both sides of the respective compensating organ, and a measurement of a pressure difference is carried out by means of the third pressure connection point. On the basis of these measured values, the hydraulic resistance coefficients of all branches and segments on the primary line are calculated. Finally, the adjustment positions of each compensating organ are calculated and set on the basis of knowledge of the desired flow in each branch and utilizing the specific resistance coefficients. The compensation method requires multiple pressure connection points for each compensating organ, and is not designed for a dynamic balancing of a fluid transport system.

EP 2 085 707 shows the hydraulic balancing of a heating system, wherein a heating element is equipped with a measuring device for measurement of the pressure and flow volume. Means are included for the detection of the flow volume as provided, as are means for detecting the pressure difference between the in-flow and the outlet flow. Means for the detection of the flow volume are arranged on the heating element, and serve the purpose of eliminating errors and automating the balancing.

EP 0 795 724, which is in the same patent family as DE 69706458, shows substantially the same features as DE 69706458.

DE 199 12 588 shows a hydraulic system having multiple conduit lines. For the purpose of improving the regulating behavior, valves with an electronic flow volume measuring device and an actuator drive are arranged in both a primary circuit and in the conduit lines of the consumer circuits.

EP 2 157 376 shows an arrangement for hydraulically balancing a system for the purpose of cooling or heating. The system has an in-flow line, an outlet flow line, a throttle device, and a measuring device for a flow volume. Valves are included in each line for the purpose of hydraulic balancing, and measuring means are included for the purpose of determining the flows into the individual lines.

Therefore, in the prior art, a separate sensor is included in each consumer for the purpose of determining the flow. As a result, a great degree of complexity is particularly inherent in the installation process.

ILLUSTRATION OF THE INVENTION

The problem addressed by the present invention is that of suggesting a device and a method for balancing a group of consumers in a fluid transport system, which do not have at least some of the disadvantages of the prior art. The particular problem addressed by the invention is that of suggesting a device and a method for balancing a group of consumers in a fluid transport system, which are designed for a dynamic balancing of the fluid transport system, and do not require separate sensors for each consumer for the purpose of determining the flow.

According to the present invention, these goals are achieved by the features of the independent claims. Additional advantageous embodiments are also found in the dependent claims and in the description.

The aims named above are particularly achieved by the present invention in that, for the purpose of balancing a group of consumers in a fluid transport system in which each consumer is configured with a motorized regulating valve for the purpose of regulating the flow through the consumer, characteristic data for the consumer is saved which determines a valve position of the corresponding regulating valve for the target throughput through each consumer. A momentary total throughput through the group of consumers is determined by means of a common flow sensor. A balancing factor is determined based on the momentary total throughput and a sum of the desired target throughputs through the consumers. A dynamic balancing of the consumers is executed by setting the valve positions of the corresponding regulating valves based on the characteristic data and the balancing factor.

A device for balancing the group of consumers in the fluid transport system accordingly comprises a characteristic data module which is designed to save the characteristic data for the consumers, and a balancing module which is designed to determine the balancing factor based on the momentary total throughput and a sum of the desired target throughputs through the consumers, and to carry out the dynamic balancing of the consumers by setting the valve positions of the corresponding regulating valves based on the characteristic data and the balancing factor.

By balancing the consumers based on the momentary total throughput and the sum of the desired target throughputs, an automatic and dynamic balancing of the fluid transport system is enabled which arrives at a measurement of the target throughput through the group of consumers using only one single common flow sensor, without the need for including multiple, separate flow sensors and/or pressure connection points into the regulating valves of the individual consumers for this purpose.

The momentary total throughput and the balancing factor are preferably determined in a repeated manner, and the dynamic balancing executed until the momentary total throughput is within a defined threshold range around the sum of the desired target throughputs. The balancing module is accordingly designed to make repeated determinations of the momentary total throughput and the balancing factor, and to execute the dynamic balancing until the momentary total throughput is within a defined threshold range around the sum of the desired target throughputs. If a zero-tolerance is prespecified, the dynamic balancing is executed until the momentary total throughput corresponds to the sum of the desired target throughputs.

The continuing determination of the target throughput and the balancing factor makes it possible to automatically, dynamically, and continuously balance the fluid transport system and/or the consumers, and to match altered system conditions and/or consumer requirements.

In one embodiment variant, the characteristic data for the consumers of the group is detected in that the regulating valves are set in a closed position for a first part of the consumers, and the flow through a second part of the consumers is measured in different valve positions, by means of the common flow sensor. For example, the characteristic data for each of the consumers of the group is detected in that the regulating valves are set in a closed position for the other consumers of the group, and the flow through the one of the consumers is measured in different positions by means of the common flow sensor.

Accordingly, the characteristic data module is designed to detect the characteristic data by setting the regulating valve for the first part of the consumers in a closed position, and to measure the flow through the second part of the consumers in different valve positions by means of the common flow sensor. By way of example, the characteristic data module is designed to detect the characteristic data for the one consumer of the group, in each case, by setting the regulating valve for the other consumers of the group in a closed position, and measuring the flow through the one of the consumers in different valve positions, by means of the common flow sensor.

The determination of the characteristic data of the consumers and/or the regulating valves by means of sequential testing of a single consumer and/or a regulating valve of the group with the regulating valve of the remaining consumers of the group closed enables a particularly simple and efficient determination. The simultaneous measurement of multiple consumers and/or regulating valves of the group with the regulating valve of the remaining consumers of the group closed, for example a pair-wise measurement, enables a more precise determination if the flow comes into the working space of the flow sensor being used more easily as a result of the simultaneous opening of multiple regulating valves.

In a further embodiment variant, a one-time regulation of the consumers is carried out if a maximum position has been reached in at least one of the regulating valves. Accordingly, the balancing module is designed to execute a one-time actuation of the consumers once at least one of the regulating valves has reached a maximum position. For example, priority data is saved for each of the consumers, and the flow through the consumers with low priority is throttled once a maximum position has been reached in a regulating valve of a consumer with high priority. Accordingly, the characteristic data module is designed, by way of example, to save priority data for each of the consumers, and the balancing module is designed to throttle the flow through the consumers with lower priority if a flow which is too low is detected in a regulating valve of a consumer with higher priority, as a result of the same reaching the maximum position.

In a further embodiment variant, once a defined minimum position has been achieved in at least one of the regulating valves, the pump and/or fan output is reduced for the purpose of preventing flow noises. Accordingly, the balancing module is designed to reduce the pump and/or fan output to prevent flow noises resulting from a fluid if the defined minimum position has been reached in at least one the regulating valves. In a further embodiment variant, the regulating valves are controlled in such a manner that at least one valve reaches the maximum position. The flow is adjusted by the targeted control of the fan and/or the pump via an upstream regulating valve of the entire group. Accordingly, the balancing module is designed for the purpose of preventing flow noises resulting from a flowing fluid.

In a further embodiment variant, valve positions of the corresponding regulating valves are set based on the characteristic data, the balancing factor, and—if pump output is reduced and the sum of the desired target throughput remains constant through the consumers—with an increased degree of opening of the corresponding regulating valve up to a defined maximum position in at least one of the regulating valves.

In addition to a method and a device for balancing a group of consumers in a fluid transport system, the present invention also relates to a computer program product having computer program code for the purpose of controlling one or more processors of a device in such a manner that the device executes the method for balancing the group of consumers in the fluid transport system, particularly a computer program product having a computer-readable, writable, non-volatile memory device on which the computer program code is stored.

BRIEF DESCRIPTION OF THE DRAWINGS

One embodiment of the present invention is described below with reference to an example. The example of the embodiment is illustrated by the following attached figures, wherein.

WAYS OF IMPLEMENTING THE INVENTION

Figure 1:
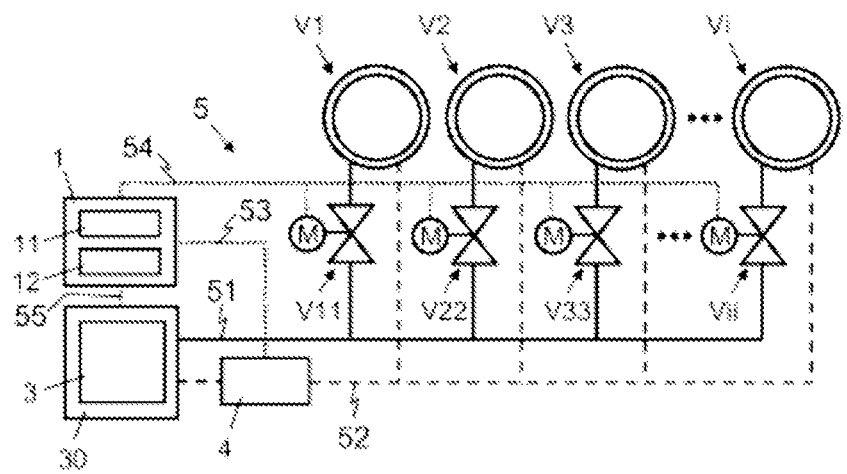
FIG. 1: shows a block diagram which schematically illustrates a fluid transport system having a group of consumers and a device for the dynamic balancing of the consumers.
Figure 2:
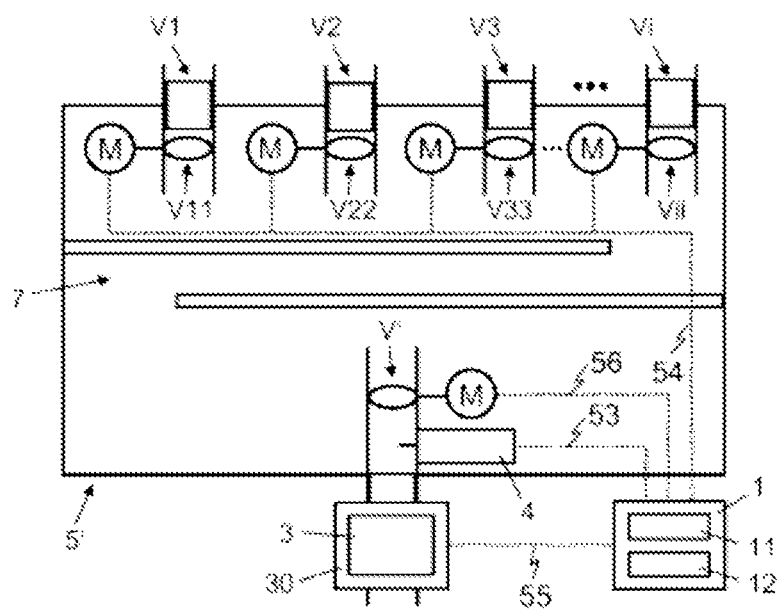
FIG. 2: shows a block diagram which schematically illustrates a fluid transport system for gaseous fluids, having a group of consumers and a device for the dynamic balancing of the consumers.

In FIGS. 1 and 2, the reference numbers 5 and 5' each indicate fluid transport systems having a group of multiple consumers (V1, V2, V3, Vi), for example HVAC (heating, ventilating, and air conditioning) fluid transport systems 5, 5'. As is schematically illustrated in FIGS. 1 and 2, the fluid transport systems 5, 5' each have a machine 3 for conveying the fluids in the fluid transport system 5, 5', particularly one or more pumps for the purpose of conveying fluids such as water, for example, or one or more fans for the purpose of conveying gaseous fluids such as air, for example.

FIG. 1 illustrates the closed circulation of the fluid transport system 5, having a feed line 51 (in-flow) and an outlet line 52, for example pipe conduits. By way of example, the consumers (V1, V2, V3, Vi) have one or multiple devices for the exchange of thermal energy, particularly heat exchangers for heating or cooling, for example heating elements, floor heaters or refrigeration units, or so-called chillers.

As illustrated in FIGS. 1 and 2, the consumers (V1, V2, V3, Vi) each have a regulating valve (V11, V22, V33, Vii) assigned to the same for the purpose of regulating the flow to and/or through the consumers (V1, V2, V3, Vi). The regulating valves (V11, V22, V33, Vii) are each arranged at the in-flow (feed line 51) or the outlet flow (outlet line 52) of the consumers (V1, V2, V3, Vi). The regulating valves (V11, V22, V33, Vii) each have a controllable electric motor M which drives the respective regulating valve (V11, V22, V33, Vii), and regulates the opening, and therefore the flow and/or flow volume, through the regulating valve (V11, V22, V33, Vii) by the corresponding setting of a flow restrictor, for example a valve flap.

The reference number 30 indicates a higher-level control system which generates, by way of example, individual target values for the flows $Ft_i$ ("target flow") through the regulating valves (V11, V22, V33, Vii).

As can be seen in FIGS. 1 and 2, the fluid transport system 5, 5' has a flow sensor 4 for the purpose of measuring the target throughput and/or total flow volume $Fc_{total}$ ("current total flow") through the group of the consumers (V1, V2, V3, Vi). The flow sensor 4 is preferably arranged in the outlet flow, but can be arranged in the in-flow.

The fluid transport system 1' illustrated in FIG. 2 is designed for the transport of gaseous fluids, wherein the consumers (V1, V2, V3, Vi) are, by way of example, living spaces into which the regulating valve (V11, V22, V33, Vii) feeds supply air, and/or from which the regulating valves (V11, V22, V33, Vii) carry off outgoing air. A common motorized throttle valve V' and a noise damper 7 are connected upstream of the fluid- and/or air openings regulated by the regulating valves (V11, V22, V33, Vii).

Reference number 1 in FIGS. 1 and 2 indicates a balancing device for the purpose of balancing the group of consumers (V1, V2, V3, Vi) and/or the fluid transport system 5, 5'. As is schematically illustrated in FIGS. 1 and 2, the balancing device 1 has multiple functional modules, particularly one characteristic data module 11 and a balancing module 12. The functional modules are preferably programmable software modules for the purpose of controlling one or more processors of the balancing device 1. The functional modules are saved on a computer-readable medium which is permanently or removably connected to the balancing device 1. However, a person skilled in the art will understand that the functional module can be implemented in alternative embodiment variants wholly or partially by means of hardware components.

The balancing device 1 is connected to the regulating valves (V11, V22, V33, Vii) and/or the motors M thereof via control lines or a control bus 54 for the purpose of controlling the same. The dynamic balancing device 1 is connected to the flow sensor 4 via a measurement line or a databus 53 for the purpose of detecting the momentary total throughput and/or total flow volume $Fc_{total}$ through the group of the consumers (V1, V2, V2, V3, Vi). For the purpose of receiving control signals and/or control parameters, particularly target values for the individual flows $Ft_i$ through the regulating valves (V11, V22, V33, Vii), the balancing device 1 is connected to the control system 30 via a data line or a databus 55. Finally, the balancing device 1 is also connected via a control line or a control bus 56 to the throttle valve V'.

Figure 3:
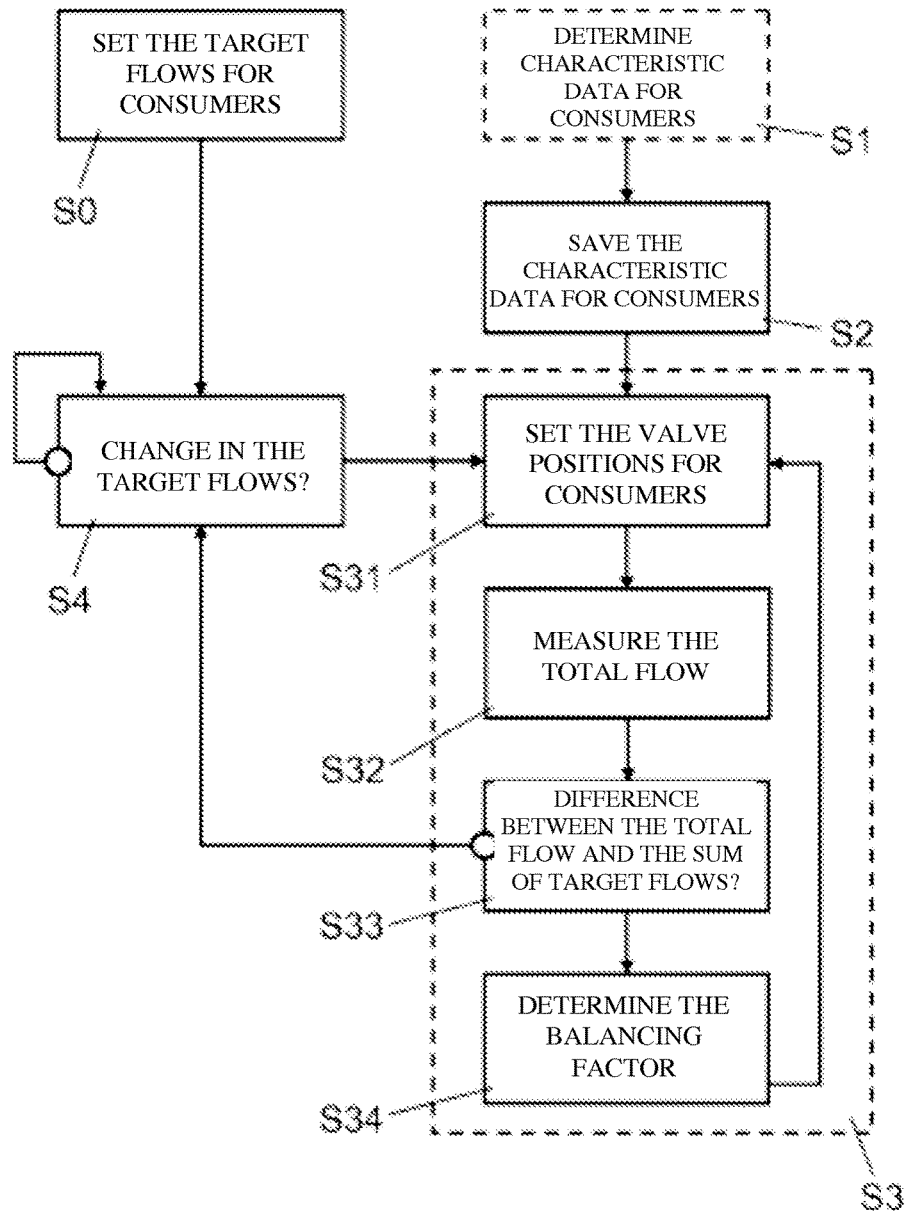
FIG. 3: shows a flow chart which illustrates a sequence of steps for the dynamic balancing of a fluid transport system having a group of consumers.

In the following paragraphs, the functions of the characteristic data module 11 and the balancing module 12, as well as possible sequences of steps for the dynamic balancing of the fluid transport system 1, 1', are described with reference to FIG. 3.

Figure 5:
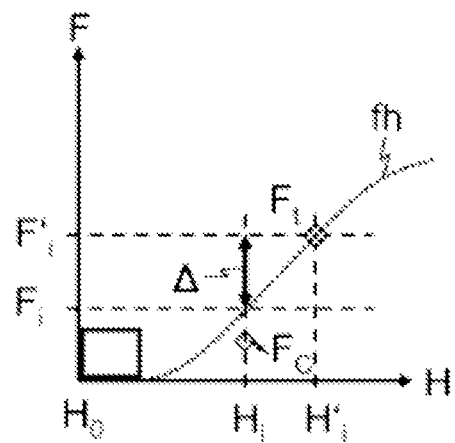
FIG. 5: shows a curve which illustrates the adjustment of a valve position utilizing the deviation of the actual flow volume from the desired flow volume, based on characteristic data of the valve.

In the preparatory and optional step S1, the characteristic data module 11 detects characteristic data for the consumers (V1, V2, V3, Vi) and/or for the regulating valves (V11, V22, V33, Vii) functionally assigned to the same, each set of said characteristic data determining a valve position of the respective regulating valve (V11, V22, V33, Vii) for the target throughput for the respective consumers (V1, V2, V3, Vi) and/or through the regulating valves (V11, V22, V33, Vii) functionally assigned to the same. The curve fh in FIG. 5 illustrates the valve position H which must be set in order to achieve a desired target throughput and/or flow volume F for a certain regulating valve (V11, V22, V33, Vii) and/or the corresponding consumer (V1, V2, V3, Vi), by way of example. In addition, based on the curve fh, it is also possible to determine the flow and/or the flow volume F through the respective consumer (V1, V2, V3, Vi) and/or through the regulating valve (V11, V22, V33, Vii) functionally assigned to the same, which is achieved at a certain valve position H of the regulating valve (V11, V22, V33, Vii).

The characteristic data module 11 detects the characteristic data by individually testing the regulating valves (V11, V22, V33, Vii) one after the other, proceeding from a closed situation in which the entire group of the regulating valves (V11, V22, V33, Vii) is closed. In the measurement of each regulating valve (V11, V22, V33, Vii), the flow F achieved through the regulating valve (V11, V22, V33, Vii) is measured in different valve positions H, and the respective valve position H as assigned to the valve is saved. In the process, for the regulating valve i being tested, the valve position H is opened in steps proceeding from the closed position $H_0$, by way of example—that is, a higher-value valve position H is set—and for each valve position $H_i$ of the regulating valve i, the momentary total throughput and/or flow volume $F_i$, as measured by the flow sensor 4, is detected, which corresponds to the flow and/or flow volume $F_i$ of the regulating valve i being tested due to the closed valve position of the other regulating valves.

In one embodiment variant, by way of example, if the flow through just one of the regulating valves (V11, V22, V33, Vii) is not in the optimal working range of the flow sensor 4, the detection of the characteristic data is carried out by testing more than one of the regulating valves (V11, V22, V33, Vii) at the same time, for example by testing pairs of the regulating valves (V11, V22, V33, Vii) at the same time. In the process, the regulating valves (V11, V22, V33, Vii) being tested at the same time are preferably measured in each of the same valve positions—meaning at the same percent of opening in each case. Based on the characteristic data which has been collected at the same time for multiple regulating valves (V11, V22, V33, Vii), the individual characteristic data are calculated for the individual regulating valves (V11, V22, V33, Vii) using arithmetic operations.

In preparatory step S2, the characteristic data for the regulating valves (V11, V22, V33, Vii) is saved. In place of the dynamic detection of characteristic data in optional step S1, in an alternative embodiment variant, known characteristic data of the regulating valves (V11, V22, V33, Vii) is collected and saved, for example from data sheets. By means of the characteristic data, a nominal flow, an identification and/or a type identification of each of the respective consumers (V1, V2, V3, Vi) and/or regulating valves (V11, V22, V33, Vii) is/are saved.

In step S0, the individual target throughputs $Ft_i$ for the regulating valves (V11, V22, V33, Vii) are determined in the control system 30, for example based on current sensor values and/or user requirements.

In step S4, when the fluid transport system 5, 5' is started up, or if a change in the target throughput $Ft_i$ is detected, step S3 is initiated and activated for the dynamic balancing of the fluid transport system 5, 5' and/or the consumers (V1, V2, V3, Vi).

In step S31, the balancing module 12 sets the valve positions of the consumers (V1, V2, V3, Vi) and/or the regulating valves (V11, V22, V33, Vii) based on the target throughputs $Ft_i$ for the individual consumers (V1, V2, V3, Vi) and/or the regulating valves (V11, V22, V33, Vii). For this purpose, the balancing module 12 uses each set of individual characteristic data of the consumers (V1, V2, V3, Vi) and/or the regulating valves (V11, V22, V33, Vii) and determines the valve position $H_i$ corresponding to the target throughput $Ft_i$ for each of the regulating valves (V11, V22, V33, Vii) on the basis of this characteristic data, by means of the momentary, individual flow $F_i$ assigned to the respective regulating valve (V11, V22, V33, Vii) which is intended to be achieved, corresponding to the initially desired target throughput $F_i = Ft_i$. As is described below, each of the current, individual flows $F_i$ is corrected for the calculation of the valve positions $H_i$ by means of the balancing factor $F'_i = \alpha \cdot F_i$ which is set initially to $\alpha = 1$.

In one embodiment variant, the balancing module 12 sets the valve positions of the consumers (V1, V2, V3, Vi) and/or the regulating valves (V11, V22, V33, Vii) additionally based on an optimized use of the machine 3 which conveys the fluids. The balancing module 12 works, by way of example, as a pump optimizer for the purpose of optimizing the output of the pump. For this purpose, the valve positions of the consumers (V1, V2, V3, Vi) and/or the regulating valves (V11, V22, V33, Vii) are increasingly opened up to a defined maximum threshold, for example 70% to 80% of the maximum opening, while the pump output is accordingly reduced in such a manner that the target throughput to be achieved remains the same. As such, it is possible to achieve the same flow and/or flow volume through each of the individual consumers (V1, V2, V3, Vi) and the fluid transport system 5, 5' overall at a reduced pump output.

In one variant, the balancing module 12 sets the valve positions of the consumers (V1, V2, V3, Vi) and/or the regulating valves (V11, V22, V33, Vii) additionally based on an optimized operation of the heating and/or cooling device, such that the in-flow temperature can be maximized and/or minimized, wherein at least one valve reaches a maximum position.

In one embodiment variant, in addition, the balancing module 12 examines whether the valve position of at least one of the consumers (V1, V2, V3, Vi) and/or the regulating valves (V11, V22, V33, Vii) has reached a maximum position with maximum opening, or a defined minimum position. In the process, valve positions are given, by way of example, as number values which indicate a degree of opening, for example in angular degrees or fractions, for example percents, of a corresponding control value. The maximum position and/or the defined minimum position of a consumer (V1, V2, V3, Vi) and/or the regulating valve (V11, V22, V33, Vii) is/are saved as part of the respective characteristic data, by way of example. If a maximum position or a defined minimum position has been reached, the balancing module 12 carries out a corresponding defined one-time regulation of the consumers (V1, V2, V3, Vi) and/or the regulating valves (V11, V22, V33, Vii).

In one variant, the one-time regulation for a detected maximum position is carried out in that the flow is throttled in the other regulating valves (V11, V22, V33, Vii) of the group in favor of the consumer (V1, V2, V3, Vi) and/or the regulating valve (V11, V22, V33, Vii) at the maximum position. For this purpose, priority data which is functionally assigned to each of the consumers (V1, V2, V3, Vi) and/or the regulating valves (V11, V22, V33, Vii) is saved, for example as part of the respective characteristic data. The priority data are classification values or number values, by way of example, which indicate a high and/or low importance or a certain level in a multi-value scale. When a maximum position has been detected, the balancing module 12 therefore reduces the opening, and thereby the flow through less important consumers (V1, V2, V3, Vi) and/or the regulating valves (V11, V22, V33, Vii) which have priority data lower than the consumer (V1, V2, V3, Vi) and/or the regulating valve (V11, V22, V33, Vii) in the maximum position.

In one variant, the one-time regulation for a detected defined minimum position reduces the fan and/or pump output in the machine 3 which conveys gaseous fluids in the fluid transport system 5, 5'—that is, in the fan—for the purpose of preventing flow noise.

In step S32, the balancing module 12 determines the momentary total throughput $Fc_{total}$ and/or the total flow volume through the group of consumers (V1, V2, V3, Vi) and/or the regulating valves (V11, V22, V33, Vii), via the flow sensor 4.

In step S33, the balancing module 12 checks whether a difference exists between the achieved momentary total throughput and/or total flow volume $Fc_{total}$ and the sum of the target throughput $$Ft_{total} = \sum_i Ft_i$$

Figure 4:
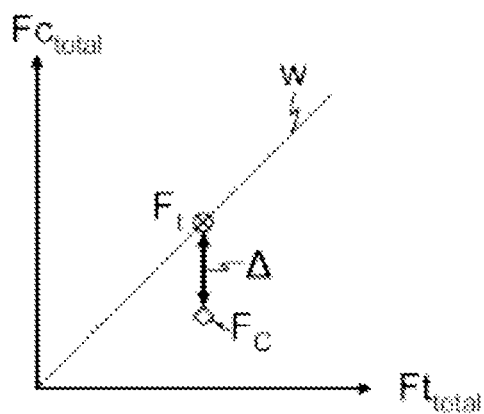
FIG. 4: shows a curve which illustrates the deviation of an actual flow volume of a valve from the desired flow volume.

("total target flow") for the entire group of the consumers (V1, V2, V3, Vi) and/or the regulating valves (V11, V22, V33, Vii). FIG. 4 schematically illustrates the deviation $\Delta$ of a momentary total throughput Fc from a target throughput Ft in a diagram in which the value line w shows the match between the momentary total throughput and/or the total flow volume $Fc_{total}$ and the sum of the target throughputs $Ft_{total}$. If no deviation and/or difference exists, meaning that the momentary total throughput $Fc_{total}$ corresponds to the total target throughput $$Ft_{total} = \sum_i Ft_i,$$

and the system is in a balanced state, the change in the target throughput $Ft_i$ is waited for in step S4. Otherwise, if the momentary total throughput $Fc_{total}$ deviates from the desired target throughput $$Ft_{total} = \sum_i Ft_i,$$

for example if the difference exceeds a defined threshold, and the sum of the desired target throughput $$Ft_{total} = \sum_i Ft_i$$

is not within a defined boundary range about the momentary total throughput and/or the total flow volume $Fc_{total}$, the balancing module continues to step S34.

In step S34, the balancing module 12 determines a balancing factor $$\alpha = \frac{\sum_i Ft_i}{Fc_{total}}$$

on the basis of the momentary, actually achieved, measured target throughput $Fc_{total}$ and the desired target throughput $$Ft_{total} = \sum_i Ft_i,$$

said balancing factor resulting from the ratio of the desired target throughput $Ft_{total}$ and the actually measured momentary total throughput $Fc_{total}$, and continues in step S31 with the calculation of new, corrected valve positions $H'_i$ in which the current, individual flows $F_i$ are each corrected by means of a balancing factor $F'_i = \alpha \cdot F_i$ (wherein the corrected individual flows $F'_i$ become the new current, individual flow $F_i$ in the next passage).

Table 1 shows one example of evolving values (with time increasing downward through the table) in a simplified fluid transport system 5, 5' comprising two consumers V1, V2:

exchanger). By way of example, a common temperature sensor is arranged upstream of the consumers (V1, V2, V3, Vi) for the determination of the input temperature $Tin_i$, or multiple separate temperature sensors are included in the in-flow of the individual consumers (V1, V2, V3, Vi). The various output temperatures $Tout_i$ are each measured by separate temperature sensors in the outlet flow of the individual consumers (V1, V2, V3, Vi). The balancing device 1 is connected to the temperature sensors and is designed to detect the input temperatures $Tin_i$ and the output temperatures $Tout_i$ of the individual consumers (V1, V2, V3, Vi) and to determine the temperature differences $\Delta T_i = Tin_i - Tout_i$ for each of the consumers (V1, V2, V3, Vi). The balancing device 1 is also designed to, when a balanced state is achieved, determine the proportional, momentary energy transfer $$Ec_i = \frac{Fc_{total} \cdot Ft_i \cdot \Delta T_i}{Ft_{total}}$$

("current total energy") through the consumers (V1, V2, V3, Vi) based on the measured momentary total throughput and/or total flow volume $Fc_{total}$ and the individual target throughputs $Ft_i$ and temperature differences $\Delta T_i$. The balancing device 1 also determines the total energy transfer $$Ec_{total} = \sum_i Ec_i$$

("current individual energy") through the consumers (V1, V2, V3, Vi). The determined total energy $Ec_{total}$ is employed in the balancing device 1 or in the higher-level control system 30 to regulate, and particularly to limit, the total energy $Et_{total} = f(Ec_{total})$ ("total target energy") given off via the fluid transport system 5, 5'. As such, it is possible in the fluid transport system 5, 5' to measure and regulate both the individual energy volumes $Ec_i$ given off in the individual consumers (V1, V2, V3, Vi), and to measure and regulate the total energy $Ec_{total}$ released in the fluid transport system 5, 5', by means of measuring the throughput and/or flow volume, in one single, common flow sensor 4.

Finally, it is hereby noted that, in the description, although computer program code has been assigned to specific func-

TABLE 1

| Total value | | | Consumer V1 and/or regulating valve V11 | | | | Consumer V2 and/or regulating valve V22 | | | |
| --- | --- | --- | --- | --- | --- | --- | --- | --- | --- | --- |
| $Fc_{total}$ | $Ft_{total}$ | $\alpha = \frac{Ft_{total}}{Fc_{total}}$ | $F_1$ | $F'_1$ | $H_1$ | $H'_1$ | $F_2$ | $F'_2$ | $H_2$ | $H'_2$ |
| 50 | 100 | 2.00 | 60 | 120 | 20° | 40° | 40 | 80 | 15° | 30° |
| 80 | 100 | 1.25 | 120 | 150 | 40° | 43° | 80 | 100 | 30° | 35° |
| 91 | 100 | 1.10 | 150 | 165 | 43° | 44° | 100 | 110 | 35° | 38° |
| 100 | 100 | 1.00 | 165 | 165 | 44° | 44° | 110 | 110 | 38° | 38° |

In one embodiment variant, temperature sensors are also arranged in the fluid transport system 5, which enable the determination of the temperature difference $\Delta T_i = Tin_i - Tout_i$ between the input temperature $Tin_i$ and the output temperature $Tout_i$ in each of the consumers (V1, V2, V3, Vi) of the fluid fed to the same and/or flowing out of the same in the relevant device which exchanges thermal energy (the heat tional modules, and the execution of steps has been portrayed in a certain sequence, a person skilled in the art will understand that the computer program code can be structured in different ways, and the sequence of at least certain steps can be modified without departing, in the process, from the subject matter for which protection is sought.

The invention claimed is:

1. A method for balancing a group of consumers in a fluid transport system in which each consumer is configured with a motorized regulating valve for a purpose of regulating fluid flow through the consumer wherein the method comprises:

obtaining characteristic data for a respective regulating valve of each consumer in said group of consumers by one of (1) flowing fluid through each regulating valve and measuring flow volume at each of plural valve positions of each regulating valve using a common flow sensor, such that separate sensors are not required for a purpose of measuring the flow, and (2) retrieving known data of the respective regulating valve of each consumer;

storing for each consumer, the characteristic data which assigns valve positions of the respective regulating valve of the consumer to target throughputs for the respective consumer, determining a momentary total throughput through the group of consumers by means of the common flow sensor, determining a balancing factor based on the momentary total throughput and a sum of desired specified target throughputs through the consumers, and executing a dynamic balancing of the consumers by setting the valve positions of the corresponding regulating valves based on the characteristic data and the balancing factor.

2. The method according to claim 1, characterized by repeated determinations of the momentary total throughput and the balancing factor, and execution of the dynamic balancing until the momentary total throughput is within a defined threshold range around the sum of the desired target throughputs.

3. The method according to claim 1, characterized by detection of the characteristic data for the consumers of the group by setting the regulating valves for a first part of the consumers in a closed position, and measuring a flow through a second part of the consumers in different valve positions by means of the common flow sensor.

4. The method according to claim 1, characterized by detection of the characteristic data for each consumer of the group by setting the regulating valves for the other consumers of the group in a closed position, and measuring a flow through the one consumer in different valve positions by means of the common flow sensor.

5. The method according to claim 1, characterized by execution of a one-time actuation of the consumers when a maximum position is reached in at least one of the regulating valves.

6. The method according to claim 1, characterized by saving of priority data for each of the consumers, and throttling of the flow through consumers with low priority, when a maximum position is reached in one of the regulating valves of a consumer with high priority.

7. The method according to claim 1, characterized by reduction of the output of a fan and/or pump when a defined minimum position is reached in at least one of the regulating valves, for a purpose of preventing flow noise by a fluid.

8. The method according to claim 1, characterized by the setting of the valve position of the corresponding regulating valves based on the characteristic data, the balancing factor, and when pump output is reduced and the sum of the desired target throughputs through the consumers is kept constant, with an increased degree of opening of the corresponding regulating valve up to a defined maximum position in at least one of the regulating valves.

9. A device for balancing a group of consumers in a fluid transport system, the fluid transport system having a motorized regulating valve for each consumer for a purpose of regulating fluid flow through the consumer, and the fluid transport system having a common flow sensor for a purpose of measuring a total throughput through the group of consumers such that separate sensors for each consumer for a purpose of determining the flow are not required, wherein the device comprises:

a characteristic data module which is designed for obtaining characteristic data for a respective regulating valve of each consumer in said group of consumers by one of (1) flowing fluid through each regulating valve and measuring flow volume at each of plural valve positions of each regulating valve using the common flow sensor and (2) retrieving known data of the respective regulating valve of each consumer, and saving characteristic data for each of the consumers, said characteristic data determining a valve position of a respective regulating valve for each of target throughputs for each of the consumers, and a balancing module which is designed to determine the momentary total throughput through the group of consumers by means of the common flow sensor, wherein the device is operative to determine a balancing factor based on the momentary total throughput and a sum of the desired target throughputs through the consumers, and wherein the device carries out a dynamic balancing of the consumers by setting the valve positions of the corresponding regulating valves based on the characteristic data and the balancing factor.

10. The device according to claim 9, wherein the balancing module is designed:

to make repeated determinations of the momentary total throughput and the balancing factor, and to execute the dynamic balancing until the momentary total throughput is within a defined threshold range around the sum of the desired target throughputs.

11. The device according to claim 9, wherein the characteristic data module is designed:

to detect the characteristic data for the consumers of the group by setting the regulating valve for a first part of the consumers in a closed position, and to measure fluid flow (F) through a second part of the consumers in different valve positions by means of the common flow sensor.

12. The device according to claim 9, wherein the characteristic data module is designed:

to detect the characteristic data for each of the consumers by setting the regulating valve for the other consumers of the group in a closed position, and to measure fluid flow (F) through the specific one of the consumers in different valve positions by means of the common flow sensor.

13. The device according to claim 9, wherein the balancing module is designed to execute a one-time actuation of the consumers when a maximum position is reached in at least one of the regulating valves.

14. The device according to claim 9, wherein the characteristic data module is designed to save priority data for each of the consumers, and the balancing module (12) is designed to throttle the flow through consumers with low priority when a maximum position is reached in one of the regulating valves of a consumer with high priority.

15. The device according to claim 9, wherein the balancing module is designed to prevent flow noise by a fluid by reducing the output of a fan and/or pump when a minimum position is reached in at least one of the regulating valves.

16. The device according to claim 9, wherein the balancing module is designed to set the valve position of corresponding regulating valves, based on the characteristic data, the balancing factor, and, when pump output is reduced and the sum of the desired target through the consumers are kept constant, with an increased degree of opening of the corresponding regulating valve up to a defined maximum position in at least one of the regulating valves.

17. A non-transitory computer readable storage medium having stored computer program code for controlling one or more processors of a device in such a manner that the device executes a method according to one of the claims 1-8 for a purpose of balancing a group of consumers in a fluid transport system.

\* \* \* \* \*